United States Patent [19]

Wilcox et al.

[11] Patent Number: 4,941,545
[45] Date of Patent: Jul. 17, 1990

[54] MUFFLER ASSEMBLY

[75] Inventors: Richard C. Wilcox, Columbus; James Allman, North Vernon; Stacy Smith, Franklin, all of Ind.

[73] Assignee: Arvin Industries, Inc., Columbus, Ind.

[21] Appl. No.: 345,141

[22] Filed: Apr. 28, 1989

[51] Int. Cl.$^5$ .......................... F01N 1/02; F01N 1/08; F01N 7/18

[52] U.S. Cl. .................................. 181/282; 181/272; 181/276

[58] Field of Search .................... 181/272, 282, 276

[56] References Cited

U.S. PATENT DOCUMENTS

| | | | |
|---|---|---|---|
| 3,638,756 | 2/1972 | Thiele | 181/282 X |
| 4,396,090 | 8/1983 | Wolfhugel | 181/282 |
| 4,456,091 | 6/1984 | Blanchot | 181/282 |
| 4,700,806 | 10/1987 | Harwood | 181/282 |
| 4,736,817 | 4/1988 | Harwood | 181/282 |
| 4,759,423 | 7/1988 | Harwood et al. | 181/282 |
| 4,760,894 | 8/1988 | Harwood et al. | 181/282 |
| 4,765,437 | 8/1988 | Harwood et al. | 181/282 |
| 4,821,840 | 4/1989 | Harwood et al. | 181/282 |
| 4,865,154 | 9/1989 | Hanson et al. | 181/282 |

FOREIGN PATENT DOCUMENTS

56-154512  11/1981  Japan.
2120318A  11/1983  United Kingdom.

Primary Examiner—Benjamin R. Fuller
Attorney, Agent, or Firm—Barnes & Thornburg

[57] ABSTRACT

A muffler assembly includes a pair of outer shells mating to define a muffler chamber and a pair of internal tuning plates mating to define inlet and outlet tubes in the muffler chamber. Drop-in baffles are used to divide the muffler chamber into an expansion chamber, a pair of exhaust turnaround chambers, and a pair of resonance chambers. The two outer shells and first tuning plates are mechanically locked together at the perimeter of the muffler assembly and the second tuning plate is piggybacked onto the first tuning plate to reduce the number of material layers included in the mechanical lock. Each of the outer shells includes one or more ribs and channels for stiffening the outer shell to reduce vibration noise and to conduct condensate developing in the muffler chamber either to a hotter region where it will vaporize or to a drain.

22 Claims, 3 Drawing Sheets

MUFFLER ASSEMBLY

BACKGROUND AND SUMMARY OF THE INVENTION

This invention relates to exhaust systems and in particular, to a muffler for controlling and reducing noise associated with engine exhaust gas. More particularly, this invention related to a muffler having internal stamped sheet metal tuning plates and drop-in baffles fixed inside a muffler chamber formed by two mating external shells.

For several years, mufflers have been constructed using stamp-formed sheet metal shells, plates, and baffles. Although conventional stamped mufflers can be assembled using fewer component parts than conventional tube mufflers, it is nevertheless recognized that it is necessary to modify the design of conventional stamped mufflers to improve the manufacturability of stamped mufflers. For example, it has been observed that weld process time for assembling conventional stamped mufflers is high and that it is often necessary to rely on costly, space-consuming, and labor-intensive welding equipment to attach conventional stamped muffler components together. It will be appreciated that the unit cost of each stamped muffler can rise significantly if the weld process time allocated for muffler assembly is very large.

It has also been observed that conventional mufflers are not generally configured to help dissipate any condensate that develops in cooler regions of the muffler chamber during passage of hot exhaust gases therethrough. Of course, development of any condensate pools or puddles along an interior wall of the muffler chamber can lead to rust or other corrosive damage to the muffler itself and possibly to development of muffler leakage problems. Moreover, a pool of condensate can freeze in the muffler chamber or its internal passageways during cold weather and block the flow of exhaust gas through the muffler to such an extent that a vehicle engine connected to the muffler cannot be started.

All mufflers vibrate quite a lot during use because of irregular pulsation of high-temperature, vehicle exhaust gas conveyed through the muffler chambers and passageways. Such pulsations are known to vary between 25 and 300 cycles per second in an irregular pattern and create muffler shell vibration and noise. Stamped mufflers are particularly susceptible to excessive shell noise problems due, in part, to a lack of adequate internal support structure for the muffler shells.

One object of the present invention is to provide a muffler assembly made of stamp-formed components which can be assembled quickly and easily without using costly complex welding techniques.

Another object of the present invention is to provide a muffler assembly with condensate delivery channels for conducting any condensate that develops in a cool region of the muffler to a drainage outlet or to relatively hotter muffler region so that the condensate will evaporate and become entrained in the flow of hot exhaust gas exiting the muffler upon exposure to the higher heat in the relatively hotter muffler region.

Yet another object of the present invention is to provide a muffler assembly that is constructed to reduce shell noise associated with vibration occurring during muffler use.

According to the present invention, a muffler assembly includes a first shell half and a second shell half attached to the first shell half at a perimetrically extending split line to define a muffler chamber therebetween. The first and second shell halves cooperate to define a flange-receiving space therebetween at the split line. An inlet port is provided in the muffler assembly for admitting exhaust gas into the muffler chamber and an outlet port is also provided for expelling exhaust gas from the muffler chamber.

A first tuning plate is disposed in the muffler chamber. The first tuning plate has a flange edge trapped in the flange-receiving space to retain the first tuning plate in a fixed position dividing the muffler chamber into a first chamber between the first tuning plate and the first shell half and a second chamber between the first tuning plate and the second shell half. A second tuning plate is also disposed in the second chamber. The second tuning plate cooperates with the first tuning plate to define exhaust gas-conducting tubes connected to the muffler chamber inlet and outlet. Means is provided for attaching the second tuning plate to the first tuning plate in piggyback relation to provide the exhaust gas-conducting tubes and to retain the second tuning plate in mating engagement with the first tuning plate without extending into the flange-receiving space at the split line so that only the first shell half, second shell half, and first tuning plate are rigidly joined together at the split line.

In preferred embodiments, each of the first and second shell halves and the first tuning plate include a perimetrically extending flange or skirt which are arranged to lie in side-by-side relation with the first tuning plate flange sandwiched between the spaced-apart shell half skirts upon assembly of the stamp-formed components comprising the muffler assembly. This three-layer sandwich of sheet metal flanges is mechanically locked using a press to define a perimetrically extending rolled seam connection situated outside of the muffler chamber. Advantageously, the number of sheet metal layers which need to be locked together is minimized using this design.

It will be appreciated that the difficulty associated with mechanically locking or welding sandwiched layers of sheet material together increases every time an additional layer of sheet material is added to the sandwich. Accordingly, attachment of the second tuning plate directly to the first tuning plate in piggyback relation without arranging the second tuning plate as a fourth layer to be mechanically locked or welded to the shell half skirts and the first tuning plate flange can lead to improved manufacturability of a muffler assembly.

In preferred embodiments of the invention, each shell halve is formed to include a longitudinally extending, internal delivery channel configured to conduct condensate from one point to another in the muffler chamber. Each shell half is also formed to include a plurality of transversely extending tributary channels aligned in spaced-apart relation to intersect the longitudinally extending delivery channel at spaced points along its length. While some of these tributary channels will receive mounting flanges of drop-in, flow-control baffles installed in the muffler chamber between one of the shell halves and one of the tuning plates, at least one of the tributary channels will be arranged to extend into a condensate-developing region to collect condensate developed therein and feed such collected condensate into the longitudinally extending delivery channel for delivery to a destination or drain outlet in the muffler assembly. Not only do those channels provide an elongate draining or collecting function, but they also serve to stiffen the outer shells, thereby reducing shell noise caused by vibration during muffler use.

Additional objects, features, and advantages of the invention will become apparent to those skilled in the art upon consideration of the following detailed description of the preferred embodiments exemplifying the best mode of carrying out the invention as presently perceived.

BRIEF DESCRIPTION OF THE DRAWINGS

The detailed description particularly refers to the accompanying figures in which.

DETAILED DESCRIPTION OF THE DRAWINGS

Figure 1:
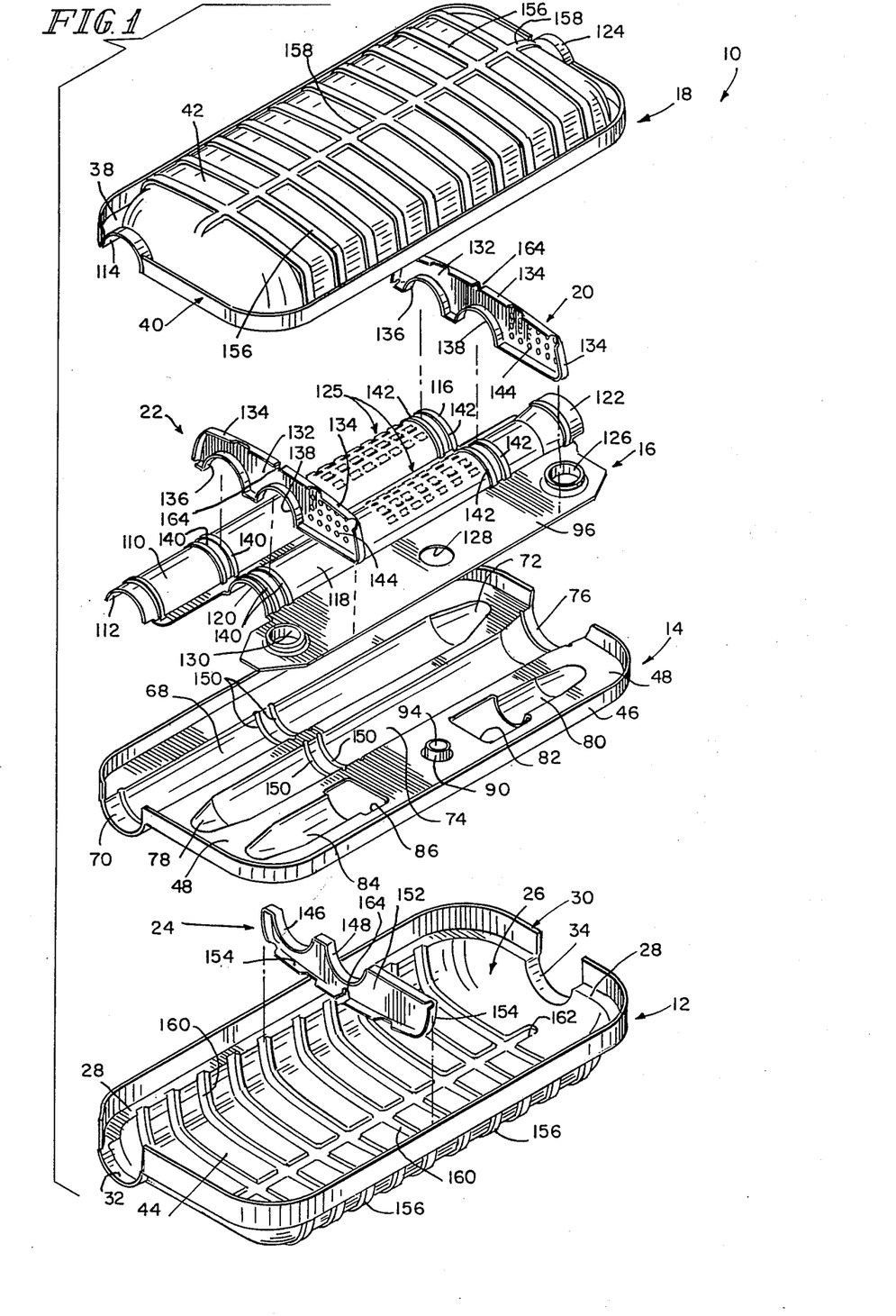
FIG. 1 is an exploded view showing assembly of a preferred embodiment of a muffler according to the present invention.

Muffler assembly 10 includes a top shell half 12, a full tuning plate 14, an insert tuning plate 16, a bottom shelf half 18, a pair of drop-in baffles 20, 22 for use in the bottom shell half 24, and a single drop-in baffle 14 for use in the top shell half 12, as shown in FIG. 1. In the illustrated embodiment, each of these components is stamp-formed sheet metal. For example, aluminized and non-aluminized cold-rolled steel or AISI/SAE grade 409 stainless steel are suitable for stamping to form the stamped components of muffler assembly 10.

Top shell half 12 is shown underneath bottom shell half 18 in FIG. 1 to provide a better illustration of the way in which the muffler assembly 10 components go together. This same convention is continued in FIG. 2 wherein the full tuning plate 14 is shown underneath the smaller insert tuning plate 16. However, in FIGS. 3-5, the entire muffler assembly 10 has been rotated 180° about the longitudinal axis 11 of the muffler assembly 10 to assume a normal "upright" orientation wherein top shell half 12 is above bottom shell half 18. It will be appreciated that the muffler assembly 10 will function in its intended manner regardless of the orientation of the muffler assembly 10 during operation.

Top shell half 12 includes a hollowed basin 26 having a flat horizontal perimeter shelf 28 around the cavity provided by basin 26 and an upstanding, thin-walled, perimetrically extending skirt 30 appended to shelf 28 as shown in FIG. 1. The basin 26 and skirt 30 are cut away as shown at 32 to provide an inlet opening into basin 26 and at 34 to provide an outlet exiting basin 26.

Bottom shell half 18 likewise includes a hollowed basin 36 and a perimeter web 38 surrounding the cavity provided by basin 36. A skirt 40 is formed along the outer perimeter of web 38 to extend from web 38 in a direction toward the bottom wall 42 of bottom shell half 18. In contrast, skirt 30 formed along the outer perimeter of shelf 28 on top shell half 12 extends from shelf 28 in a direction away from the bottom wall 44 of top shell half 12. It will be understood that skirts 30 and 40 will lie in substantially spaced-apart parallel relation around the perimeter of muffler assembly 10 once all of the muffler components are put together as shown in FIG. 1 to provide a space extending about the muffler perimeter. This space is sized to receive a perimeter lip or flange 46 provided on the full tuning plate 14.

Figure 2:
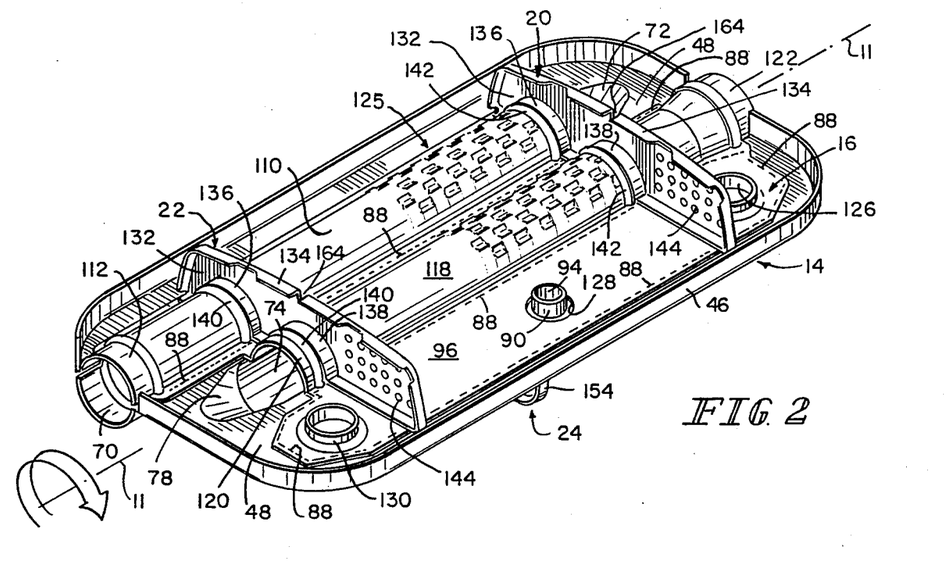
FIG. 2 is a view of a muffler subassembly of the embodiment of FIG. 1 showing a union of two stamped tuning plates to form separate elongated inlet and outlet tubes therebetween and attachment of several drop-in baffles to these tuning plates to manage exhaust flow in the muffler.

This spaced-apart configuration of the top and bottom shell halves 12, 18 permits the full tuning plate 14 to be nested within perimetrically extending skirt 40 of top shell half 12 in engagement with perimeter shelf 28. Also, bottom shell half 18 can be nested within the perimeter flange 46 of full tuning plate 14 so that perimeter web 38 engages a flat surface 48 of full tuning plate 14. Once nested, the three layer sandwich comprising skirt 30, lip 46, and skirt 40 can be rolled using a press to form a mechanical lock 50 as shown best in FIG. 3 clamping the full tuning plate 14 and the top and bottom shell halves 12, 18 together. Advantageously, only three layers of sheet metal must be rolled together to form this mechanical lock 50 because the insert tuning plate 16 is attached directly to the flat surface 48 of full tuning plate 14 as illustrated in FIG. 2.

Mechanical lock 50 provides a solid connection at low cost without the need for a lot of complex welding. Further, a potential weld contamination problem is avoided in cases where an aluminized coating is applied to the sheet metal before welding. Although it is expected that these three sheet metal layers could be connected using laser welding techniques or the like, a mechanical lock is presently preferred.

The full tuning plate 14 is configured to cover the open mouth of basin 26 when it is nested within perimetrically extending skirt 30 to engage perimeter shelf 28. In such a nested position, full tuning plate 14 partitions the muffler chamber 52 formed inside muffler assembly 10 upon union of the top and bottom shell halves 12, 18 into first and second chambers 54, 56 as shown best in FIG. 5. The hollow basin 26 in top shell half 12 defines the boundary of first chamber 54 and the complementary hollow basin 36 in bottom shell half 18 defines the boundary of second chamber 56. As shown best in FIG. 5, the first and second drop-in baffles 20, 22 are arranged to partition the second chamber 56 into a central expansion chamber 58 and a pair of spaced-apart exhaust turnaround chambers 60, 62 in the bottom shell half 18. Further, the third drop-in baffle 24 is arranged to divide the first chamber 54 into a pair of resonance chambers 64, 66 in the top shell half 12.

The full tuning plate 14 is stamp-formed to include a flat surface 48 on which the insert tuning plate 16 is mounted and a plurality of recessed channels and apertures which cooperate with certain surfaces of the insert tuning plate 16 to guide flow of exhaust gas into and out of the muffler chamber 52 and the two resonance chambers 64, 66. As shown in FIG. 1, the full tuning plate 14 provides a first inlet channel section 68 extending between a mouth section 70 configured to nest in inlet opening 32 of top shell half 12 and a conic section 72 situated in the first turnaround chamber 60. A first outlet channel section 74 is provided in full tuning plate 14 and extends from a mouth section 76 configured to nest in outlet opening 34 of the top shell half 12 and a conic section 78 situated in the second turnaround chamber 62. Full tuning plate 14 is also formed to include a first tuning throat channel 80 leading from first turnaround chamber 60 to an aperture 82 in flat surface 48 to conduct exhaust gas from the first turnaround chamber 60 into the first resonance chamber 64. Likewise, a second tuning throat channel 84 leading from second turnaround chamber 62 to an aperture 86 in flat surface 48 is formed in full tuning plate 14 to conduct exhaust gas from the second turnaround chamber 62 into the second resonance chamber 66.

Figure 4:
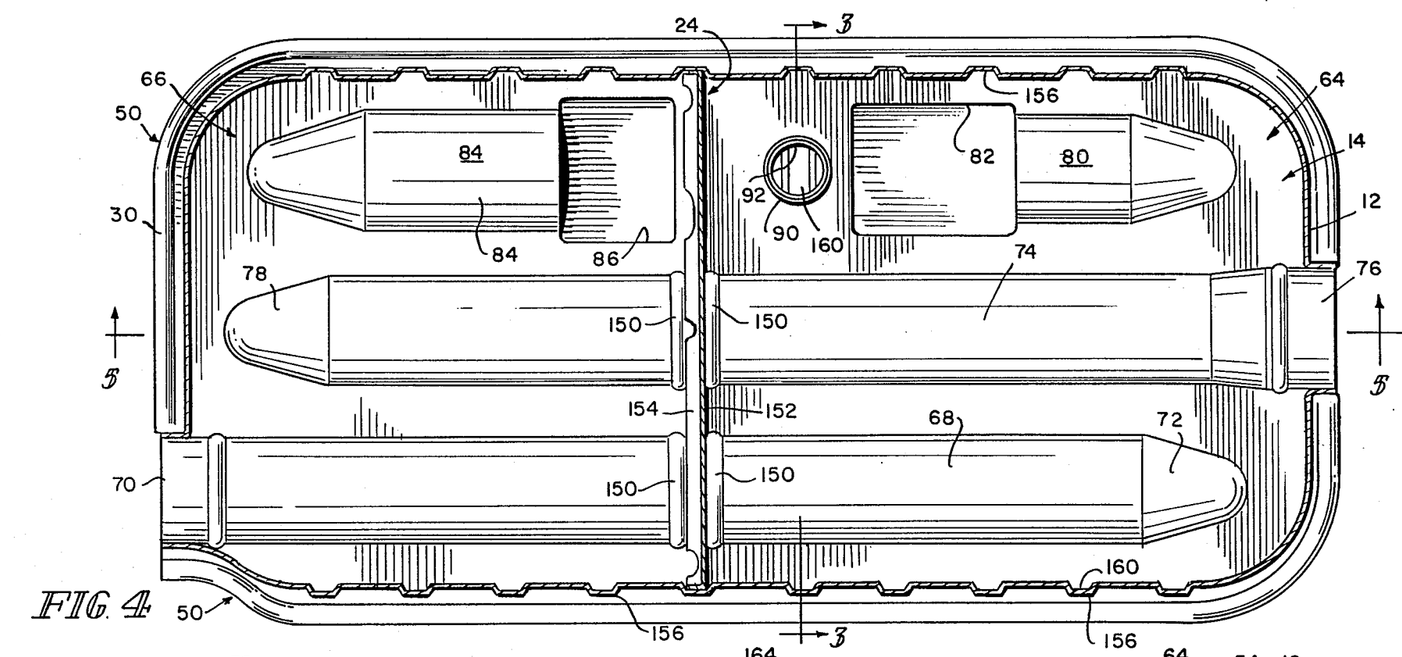
FIG. 4 is a reduced longitudinal sectional view taken along lines 4—4 of FIG. 3 showing a top plan view of the first tuning plate and a single drop-in baffle mounted thereon.

As shown in FIG. 1, the first inlet and outlet channel sections 68, 74 and the tuning throat channels 80, 84 are aligned in three spaced-apart parallel rows to provide enough room on flat surface 48 between the rows and around the channels to support a companion surface of insert tuning plate 16. Preferably, a seam weld represented by dotted line 88 is used as shown in FIGS. 2 and 4 to connect the flat surface 48 between these channel rows and around the channels to attach the insert tuning plate 16 securely to the full tuning plate 14. Advantageously, using this technique, it is not necessary to provide a perimeter flange on the insert tuning plate 16 and add this flange as a fourth layer to the three-layer sandwich which must be rolled to form the mechanical lock 50 clamping the muffler assembly 10 components together. It will be appreciated that manufacturability of muffler assembly 10 is improved by keeping the number of layers that must be rolled to provide mechanical lock 50 (or welded to provide a welded joint) to a minimum.

The full tuning plate 14 also includes an auxiliary tuning tube 90 extending through an aperture formed in flat surface 40 to interconnect the first resonance chamber 64 and the expansion chamber 58 in fluid communication. Auxiliary tuning tube 90 includes an inlet 94 positioned in first resonance chamber 64 and an outlet 92 positioned in expansion chamber 58 as shown best in FIG. 3. Advantageously, provision of such an auxiliary tuning tube 90 acts to enhance the acoustic tuning capabilities of muffler assembly 10 by providing a second entry path for admission of exhaust gas into the first resonance chamber 64. It will be appreciated that it is within the scope of the present invention to vary both the size and the location of tuning tube 90.

The insert tuning plate 16 is configured to nest within the perimetrically extending lip or flange 46 provided on full tuning plate 14 and to attach to flat surface 48 of the full tuning plate as shown best in FIG. 2. Advantageously, the weight of insert tuning plate 16 is reduced because of its smaller size in comparison to the larger full tuning plate 14. Specifically, the area of flat surface 96 on insert tuning plate 16 can be kept to a minimum as shown best in FIGS. 1 and 5 because this flat surface 96 is used primarily to provide an attachment flange coupled to flat surface 48 of the full tuning plate 14 by seam weld 88 or other appropriate weld and to provide a cover for each of the first and second tuning throat channels 80 and 84.

The insert tuning plate 16 is stamp-formed to include a second inlet channel section 110 having a mouth section 112 configured to mate with an inlet opening 114 formed in bottom shell half 18 and an exit section 116 emptying into the first exhaust turnaround chamber 60. A second outlet channel section 118 is also formed in insert tuning plate 16 having an intake section 120 communicating with the second exhaust turnaround chamber 62 and a mouth section 122 configured to mate with an outlet opening 124 formed in bottom shell half 18. Louver sections 125 are desirably provided in each of channel sections 110 and 118.

As shown best in FIG. 2, the first and second inlet channel sections 68, 110 cooperate to define an elongated inlet tube for conducting exhaust gas from an inlet port of the muffler assembly 10 into the first exhaust turnaround chamber 60 upon joinder of the tuning plates 14, 16 to one another. Similarly, the first and second outlet channel sections 74, 118 cooperate to define an elongated outlet tube for conducting exhaust gas from the second turnaround chamber 62 to an outlet port of the muffler assembly 10.

The largest part of flat surface 96 on insert tuning plate 16 extends along the length of second outlet channel section 118 as shown best in FIG. 1 and provides a first throat inlet aperture 126 opening into first exhaust turnaround chamber 60, an auxiliary throat aperture 128 opening into expansion chamber 58, and a second throat inlet aperture 130 opening into second exhaust turnaround chamber 62. The first throat inlet aperture 126 conducts exhaust gas from first turnaround chamber 60 through the flat surface 96 into the underlying first tuning throat channel 80 stamp-formed in full tuning plate 14 for delivery to the first resonance chamber 64 via plate aperture 82. Likewise, the second throat inlet aperture 130 conducts exhaust gas from second turnaround chamber 62 through the flat surface 96 into the underlying second tuning throat channel 84 stamp-formed in full tuning plate 14 for delivery to the second resonance chamber 66 via plate aperture 86. The diameter of auxiliary throat aperture 128 is selected to pass the inlet 94 of auxiliary tuning tube 90 therethrough upon attachment of the insert tuning plate 16 to the flat surface 48 of full tuning plate 13 as shown best in FIG. 2.

Each of the first and second drop-in baffles 20, 22 is stamped to form a flat vertical wall 132 and a plurality of mounting flanges 134 around the perimeter of vertical wall 132. First and second semicircular flanges 136, 138 are provided along a bottom edge of baffles 20, 22 for mating with the half round exterior surface of the second inlet and outlet channel sections 110, 118 of the insert tuning plate 16. A first pair of raised, semicircular sealing beads 140 are formed in each of the exterior surface of channel sections 110, 118 at the interface between the second turnaround chamber 62 and the expansion chamber 58 as shown best in FIG. 1. Similarly, a second pair of raised, semicircular sealing beads 142 are formed in each of the exterior surface of channel sections 110, 118 at the interface between the expansion chamber 58 and the first turnaround chamber 60. The sealing beads 140, 142 on each channel section are laterally spaced apart as shown in FIG. 1 to receive one of the semicircular flanges 136, 138 provided on the bottom edge of the baffles 20, 22. These sealing beads advantageously improve the gas and vapor seal provided between each of the baffles 20, 22 and the insert tuning plate 16 once the baffles 20, 22 are spot-welded in place on plate 16.

Each of first and second drop-in baffles 20, 22 also includes a field of perforations 144 or the like which overlies the widest section of flat surface 96 upon attachment of baffles 20, 22 to insert tuning plate 16. The perforations 114 allow exhaust gas in the first exhaust turnaround chamber 60 to travel to the second exhaust turnaround chamber 62 via the expansion chamber 62. In effect, the bottom shell half 18 and the insert tuning plate 16 cooperate with the help of perforated drop-in baffles 20, 22 to establish a return passageway interconnecting the outlet aperture of the elongated inlet tube provided by first and second inlet channel sections 68, 110 and the intake aperture of the elongated outlet tube provided by the first and second outlet channel sections 74, 118 in fluid communication. Advantageously, the entire second chamber 56 provided in the hollow basin 36 of the bottom shell half 18 functions as a return passage for exhaust gas from the inlet tube to the outlet tube, which return passage is also in communication with resonance chambers 64, 66. In contrast, conventional stamped muffler designs have generally required that the internal tuning plates be stamped to define a return tube interconnecting the stamp-formed inlet and outlet tubes formed in the tuning plates.

Figure 5:
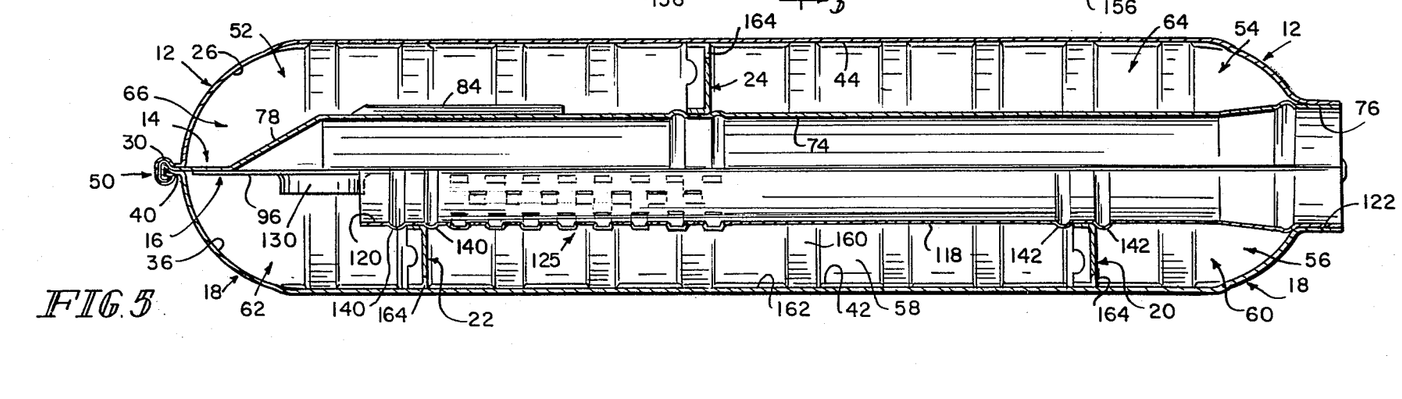
FIG. 5 is a longitudinal sectional view taken along lines 5—5 of FIG. 4 showing a pair of separate resonance chambers in the top shell half and an expansion chamber sandwiched between two exhaust turnaround sections in the bottom shell half.

The third drop-in baffle 24 is similar in configuration to the other two drop-in baffles 20, 22 and is attached to the full tuning plate 14 as shown best in FIG. 5 to provide a barrier separating the two resonance chambers 64, 66 provided in the top shell half 12. The location of first and second semicircular flanges 146, 148 is complementary to the location of those flanges 136, 138 on baffles 20, 22 to permit baffle 24 to mate properly with the half round exterior surfaces of the first inlet and outlet channel sections 68, 74 formed in full tuning plate 14. A pair of annular sealing bead pairs 150 is also provided on each of channel sections 68, 74 at the interface between the first and second resonance chambers 64, 66 to enhance the vapor and gas seal provided by the third drop-in baffles 24 between those two resonance chambers 64, 66. Of course, vertical wall 152 of third drop-in baffle 24 does not include any perforations therein so that direct communication between the first and second resonance chambers 64, 66 is blocked. A plurality of mounting flanges 154 are formed along the perimeter of vertical wall 152 to provide means for attaching the third drop-in baffle 24 to the full tuning plate 14 and the top shell half 12.

The basins 26, 36 in each of the top and bottom shell halves 12, 19 include a plurality of spaced-apart transversely extending exterior ribs 156 and a longitudinally extending exterior rib 158 arranged to intersect each of the transversely extending ribs 156 at right angles as shown in FIG. 1. The transverse ribs 156 and the longitudinal rib 158 are formed by pressing on an inner wall of basins 26, 36 to press enough material in an outward direction to form the ribs 156, 158. These intersecting ribs 156, 158 advantageously function to stiffen shell halves 12, 18 considerably and also control shell noise which often occurs upon vibration of a muffler during use. Shell noise is lessened because the entire surface of each shell half 12, 18 is more rigid and less prone to vibration.

At the same time, the transverse ribs 156 provide transversely extending channels 160 along the inner wall of each hollow basin 26, 36 as shown best in FIGS. 1 and 5. These transverse channels 160 are dimensioned to receive the mounting flanges 134, 154 on each of the drop-in baffles 20, 22, 24 so that each baffle can be properly and easily aligned and fixtured in its shell half prior to welding the baffle to the shell half. In the preferred embodiment, a line of small exterior-opening, baffle-access apertures is formed in each shell half in each transverse rib which is designated to receive a baffle in its companion transverse channel so that the drop-in baffle can be welded to the abutting top shell through such baffle-access apertures once the muffler unit 10 is essentially fully assembled. Advantageously, the transverse channels 160 function as welding fixtures to hold the drop-in baffles in a selected position and orientation with respect to the abutting shell half during assembly and welding.

As shown in FIG. 1, longitudinal ribs 158 provide a longitudinally extending channel 162 in each basin 26 and 36. Advantageously, this longitudinal channel 162 functions to collect condensate that may develop in a relatively cool region of the muffler assembly 10 and deliver the condensate to a hotter region therein where it will naturally vaporize and become entrained in the exhaust gas discharged from the muffler assembly 10. It has been observed that any condensate which collects in the bottom portion of a muffler can freeze during cold weather and prevent a vehicle engine connected to the muffler from starting.

In use, the muffler assembly 10 will be typically mounted in a horizontal orientation as shown in FIG. 5. Longitudinal channel 162 is provided in a low portion of bottom shell half 18 and will collect any condensate developing in the basin and deliver it to a hotter region of the basin for vaporization. Conveniently, any condensate developing on the inner side walls of the basin will be funneled into the longitudinal channel 162. The transverse channels 160 which do not contain a drop-in baffle function, in effect, as tributaries which extend into regions where condensate is likely to develop during muffler operation to collect condensate and funnel or feed it into the longitudinal channel 162 for delivery to a destination in the second chamber 56.

Figure 3:
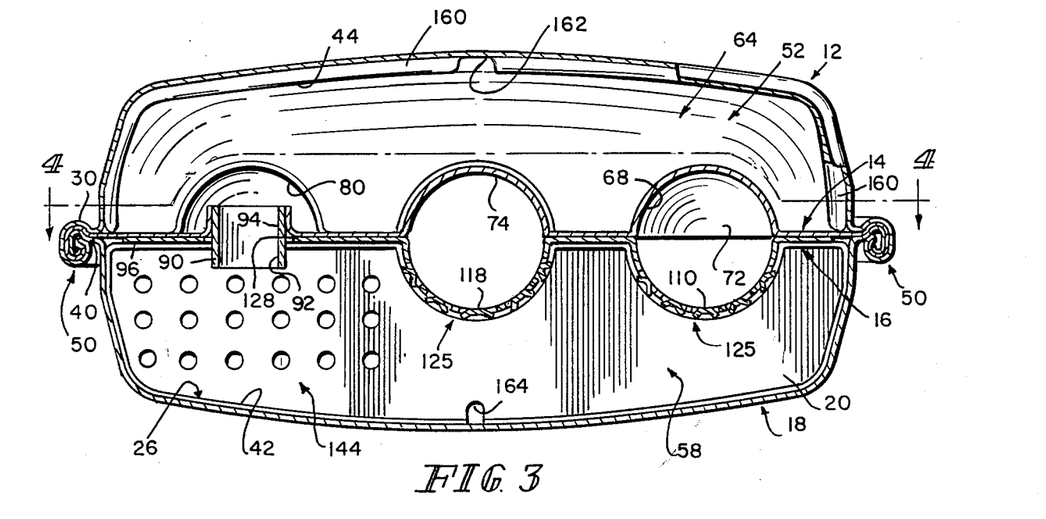
FIG. 3 is an enlarged transverse sectional view of the muffler shown in FIG. 1 after assembly and 180° rotation of the muffler about its longitudinal axis to assume an "upright" orientation wherein an expansion chamber is provided in the bottom shell half and a pair of resonance chambers are provided in the top shell half.

A longitudinal condensate delivery channel 162 is normally provided in each shell half 12, 18 so that the muffler assembly 10 is able to handle condensate delivery regardless of whether the muffler assembly 10 is mounted with the top or bottom shell 12, 18 in the gravitationally lowest position. Conveniently, each drop-in baffle 20, 22, and 24 is formed to include an aperture 164 (as shown in FIG. 3) at its perimeter edge in a location engaging in the longitudinal channel 162 so that condensate conducted through channel 162 is not blocked or otherwise obstructed by the baffles 20, 22, 24. It is also within the scope of the present invention to provide a valved or valveless drainage port in at least one of the shell halves 12, 18 in communication with longitudinal channel 162 to permit manual or automatic draining of condensate from muffler assembly 10.

Although the invention has been described in detail with reference to certain preferred embodiments, variations, and modifications exist within the scope and spirit of the invention as described and defined in the following claims.

What is claimed is:
1. A muffler assembly comprising
   a first shell half,
   a second shell half attached to the first shell half at a perimetrically extending split line to define a muffler chamber therebetween, the first and second shell halves cooperating to define a flange-receiving space therebetween at the split line, an inlet port for admitting exhaust gas into the muffler chamber, and an outlet port for expelling exhaust gas from the muffler chamber, a first tuning plate disposed in the muffler chamber, the first tuning plate having a flange edge trapped in the flange-receiving space to retain the first tuning plate in a fixed position dividing the muffler chamber into a first chamber between the first tuning plate and the first shell half and a second chamber between the first tuning plate and the second shell half, a second tuning plate disposed in the second chamber, the second tuning plate cooperating with the first tuning plate to define exhaust gas-conducting tubes connected to the muffler chamber inlet and outlet, means for attaching the second tuning plate to the first tuning plate to provide the exhaust gas-conducting tubes and to retain the second tuning plate in mating engagement with the first tuning plate without extending into the flange-receiving space at the split line so that only the first shell half, second shell half, and first tuning plate are rigidly joined together at the split line.

2. The muffler assembly of claim 1, wherein the first and second tuning plates are configured to define an elongated inlet tube therebetween conducting vehicle exhaust from the inlet port into the second chamber and to define an elongated outlet tube therebetween conducting vehicle exhaust from the second chamber to the outlet port, and a return passageway interconnecting the elongated inlet and outlet tubes in fluid communication is provided in the second chamber and defined by the second shell half and the second tuning plate.

3. The muffler assembly of claim 2, further comprising first and second drop-in baffles situated in spaced-apart relation in the second chamber to partition the second chamber to define a first exhaust turnaround chamber at one end of the second shell half communicating with a discharge port of the elongated inlet tube, a second exhaust turnaround chamber at the other end of the second shell half communicating with an intake port of the elongated outlet tube, and an expansion chamber intermediate the first and second exhaust turnaround chambers.

4. The muffler assembly of claim 3, wherein the second tuning plate is formed to include perforations interconnecting the expansion chamber and at least one of the inlet and outlet tubes in direct fluid communication.

5. The muffler assembly of claim 3, further comprising a third drop-in baffle in the first chamber, the third drop-in baffle interconnecting the first tuning plate and the first shell half to partition the first chamber into first and second resonance chambers between the first tuning plate and the first shell half, first throat means extending through the tuning plates for providing a first tuning tube interconnecting the first exhaust turnaround chamber and the first resonance chamber in acoustic communication, and second throat means extending through the tuning plates for providing a second tuning tube interconnecting the second exhaust turnaround chamber and the second resonance chamber in acoustic communication.

6. The muffler assembly of claim 5, wherein the first drop-in baffle is formed to include first aperture means for interconnecting the first exhaust turnaround chamber and the expansion chamber in fluid communication and the second drop-in baffle is formed to include second aperture means for interconnecting the expansion chamber and the second exhaust turnaround section in fluid communication.

7. The muffler assembly of claim 3, further comprising a third drop-in baffle interconnecting the first tuning plate and the first shell half to partition the first chamber into first and second resonance chambers between the first tuning plate and first shell half, primary tuning means extending through the tuning plates for providing a first tuning tube interconnecting the first exhaust turnaround chamber and the first resonance chamber in acoustic communication, and auxiliary tuning means extending through the tuning plates for providing a second tuning tube interconnecting the first resonance chamber and the expansion chamber in acoustic communication.

8. The muffler assembly of claim 7, wherein the second drop-in baffle is formed to include aperture means for interconnecting the expansion chamber and the second exhaust chamber in fluid communication.

9. The muffler assembly of claim 7, wherein the second tuning plate is formed to include an aperture opening into the expansion chamber, the second tuning tube is coupled to the first tuning plate in a position extending through the aperture formed in the second tuning plate, and the second tuning tube is formed to include an inlet opening into the first resonance chamber and an outlet opening into the expansion chamber.

10. The muffler assembly of claim 1, wherein each of the first and second shell halves includes a perimetrically extending skirt, the skirt of the second shell half is nested within the skirt of the first shell half at the split line to define the flange-receiving space therebetween about the perimeter of the first and second shell halves, and the first tuning plate includes a perimetrically extending edge flange trapped in the perimetrically extending, flange-receiving space to retain the first tuning plate in its fixed position in the muffler chamber.

11. The muffler assembly of claim 10, wherein the skirts of the first and second shell halves and the edge flange of the first tuning plate are mechanically locked to define a perimetrically extending rolled seam connection situated outside of the muffler chamber.

12. A muffler assembly comprising
a first shell half,
a second shell half attached to the first shell half at a perimetrically extending split line to define a muffler chamber therebetween, an inlet port for admitting exhaust gas into the muffler chamber and an outlet port for expelling exhaust gas from the muffler chamber,
a first tuning plate positioned in the muffler chamber to divide the muffler chamber into a first chamber between the first tuning plate and the first shell half and a second chamber between the first turning plate and the second shell half,
a second tuning plate disposed in the second chamber, the second tuning plate cooperating with the first tuning plate to define exhaust gas-conducting tubes connected to the muffler chamber inlet and outlet, the first and second tuning plates are configured to define an elongated inlet tube therebetween conducting vehicle exhaust from the inlet port into the second chamber and to define an elongated outlet tube therebetween conducting vehicle exhaust from the second chamber to the outlet port, and
a return passageway interconnecting the elongated inlet and outlet tubes in fluid communication is provided in the second chamber and defined by the second shell half and the second tuning plate.

13. The muffler assembly of claim 12, wherein the first tuning plate is a stamped metal sheet forming a first inlet channel section communicating with the inlet port and a first outlet channel section communicating with the outlet port, the second tuning plate is a stamped metal sheet forming a second inlet channel section communicating with the inlet port and cooperating with the first inlet channel section to define the elongated inlet tube and a second outlet channel section communicating with the outlet port and cooperating with the first outlet channel section to define the elongated outlet tube, the elongated inlet tube has a discharge port opening into the second chamber, the elongated outlet tube has an intake port opening into the second chamber, and the return passageway is configured to conduct exhaust gas from the discharge port of the elongated inlet tube to the intake port of the elongated outlet tube without passing through a channel provided between the first and second tuning plates.

14. The muffler assembly of claim 13, further comprising first and second drop-in baffles situated in spaced-apart relation in the second chamber to partition the second chamber to define a first exhaust turnaround chamber at one end of the second shell half communicating with a discharge port of the elongated inlet tube, a second exhaust turnaround chamber at the other end of the second shell half communicating with an intake port of the elongated outlet tube, and an expansion chamber intermediate the first and second exhaust turnaround chambers, the first drop-in baffle being formed to include first aperture means for interconnecting the first exhaust turnaround chamber and the expansion chamber in fluid communication, and the second drop-in baffle being formed to include second aperture means for interconnecting the expansion chamber and the second exhaust turnaround chamber in fluid communication, thereby establishing the return passageway interconnecting the inlet and outlet tubes through the first exhaust turnaround, expansion, and second exhaust turnaround chambers in the second chamber in the space provided between the second shell half and the second tuning plate.

15. A muffler assembly comprising
a first shell half,
a second shell half attached to the first shell half at a perimetrically extending split line to define a muffler chamber therebetween, the first and second shell halves cooperating to define a flange-receiving space therebetween at the split line, an inlet port for admitting exhaust gas into the muffler chamber, and an outlet port for expelling exhaust gas from the muffler chamber,
a first tuning plate disposed in the muffler chamber, the first tuning plate being a stamped metal sheet forming a first inlet channel section, a first outlet channel section, and a flat surface extending around each of the first inlet and outlet channel sections, the flat surface having a flange edge trapped in the flange-receiving space to retain the first tuning plate in a fixed position dividing the muffler chamber into a first chamber between the first tuning plate and the first shell half and a second chamber between the first tuning plate and the second shell half, a second tuning plate disposed in the second chamber, the second tuning plate cooperating with the first tuning plate to define exhaust gas-conducting tubes connected to the muffler chamber inlet and outlet, the second tuning plate being welded to the flat surface of the first tuning plate to fix the first and second tuning plates in mating engagement so that the first inlet and outlet channel sections cooperate with the second tuning plate to provide the gas-conducting tubes.

16. The muffler assembly of claim 15, wherein the second tuning plate is a stamped metal sheet forming a second inlet channel section, a second outlet channel section, and at least one mounting flange appended to each of the second inlet and outlet channel sections, and the at least one mounting flange is welded to the flat surface of the first tuning plate to position the first and second inlet channel sections in mutually opposing relation to define an elongated inlet tube therebetween conducting exhaust gas into the muffler chamber and also to position the first and second outlet channel sections in mutually opposing relation to define an elongated outlet tube therebetween discharging exhaust gas from the muffler chamber.

17. The muffler assembly of claim 16, wherein the second tuning plate includes a first mounting flange extending in a longitudinal direction along the length of the second inlet channel section, a second mounting flange interconnecting the second inlet and outlet channel sections and extending in said longitudinal direction, and a third mounting flange extending in said longitudinal direction along the length of the second outlet channel section, the first, second, and third mounting flanges are aligned in spaced-apart, side-by-side relation, and each of the mounting flanges of the second tuning plate is welded to the flat surface of the first tuning plate.

18. The muffler assembly of claim 16, wherein the second tuning plate includes a first mounting flange interconnecting the second inlet and outlet channel sections and a second mounting flange extending along the length of the second outlet channel section in spaced-apart, side-by-side alignment with the first mounting flange, and the second mounting flange is formed to at least one tuning tube communicating with an aperture formed in the second tuning plate to conduct exhaust gas between the first and second chambers 19. A muffler assembly comprising
a first shell half,
a second shell half attached to the first shell half to define a muffler chamber there between, the first and second shell halves cooperating to define an inlet port for admitting exhaust gas into the muffler chamber and an outlet port for expelling exhaust gas from the muffler chamber, and
divider means for partitioning the muffler chamber into a first chamber between the first shell half and the divider means and a second chamber between the second shell half and the divider means, the second shell half being formed to include a longitudinally extending, internal delivery channel configured to conduct condensate developing in a defined condensate-developing region in the second chamber along a longitudinally extending path to a destination in the second chamber remote from the defined condensate-developing region.

20. The muffler assembly of claim 19, wherein the second shell half is also formed to include a plurality of transversely extending, internal tributary channels aligned in spaced-apart relation to intersect the longitudinally extending delivery channel at spaced points along its length, and at least one of the transversely extending tributary channels extends into said defined condensate-developing region to collect condensate therein and feed such collected condensate into the longitudinally extending delivery channel for delivery to the destination in the second chamber.

21. The muffler assembly of claim 20, wherein the second shell half includes a plurality of external ribs configured to provide the delivery and tributary channels in the second chamber.

22. The muffler assembly of claim 20, further comprising at least one drop-in baffle interconnecting the divider means and the second shell half to partition the second chamber into at least two smaller chambers, each drop-in baffle including a mounting edge, the mounting edge being received in one of the tributary channels formed in the second shell half, at least one of the drop-in baffles being formed to include an aperture positioned in the delivery channel to pass condensate therethrough upon reception of the baffle-mounting edge in said one of the tributary channels so that flow of condensate in the delivery channel is not blocked by said drop-in baffle.

* * * * *